Nov. 24, 1925.
H. W. NAGEL
1,562,987
CONVEYING SYSTEM
Filed July 8, 1921 2 Sheets-Sheet 1
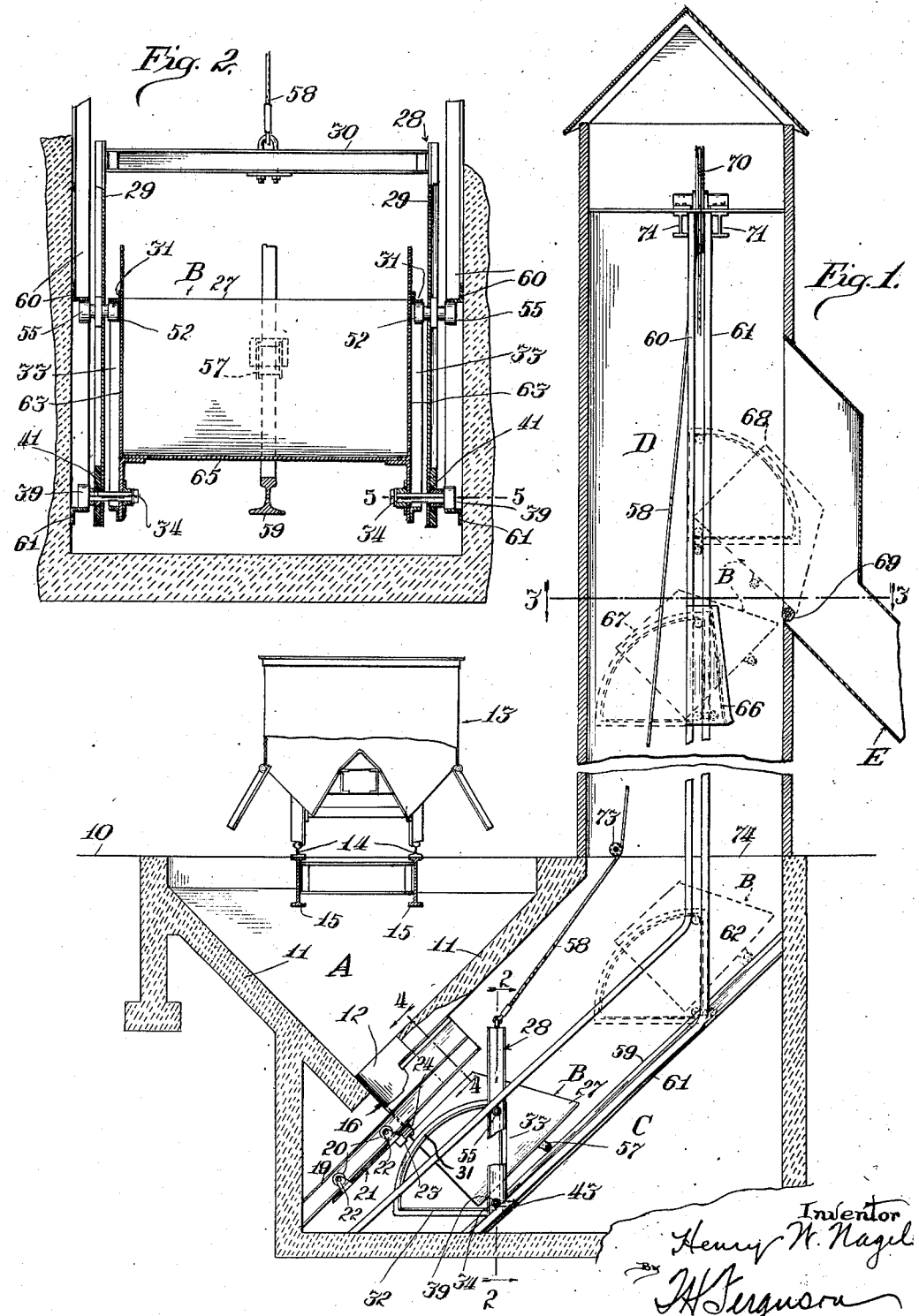

Nov. 24, 1925.
H. W. NAGEL
CONVEYING SYSTEM
Filed July 8, 1921
1,562,987
2 Sheets-Sheet 2
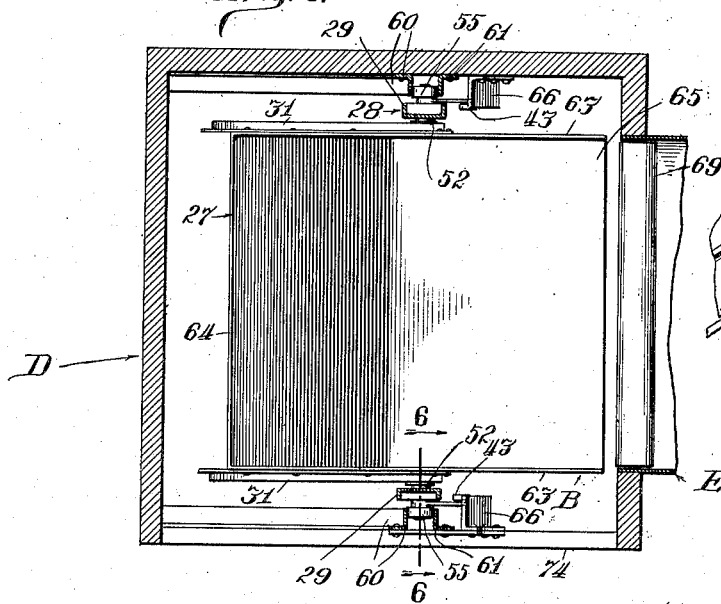
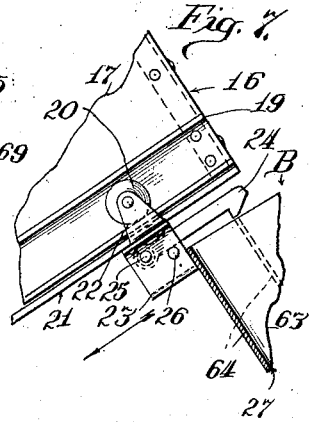
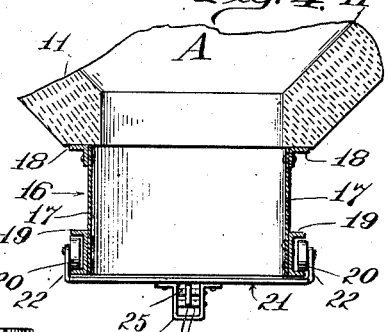
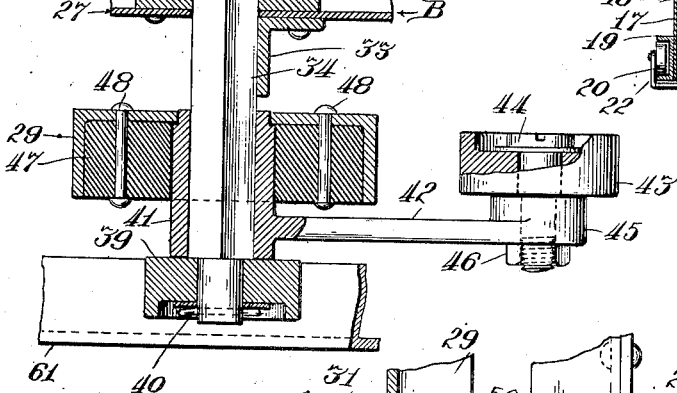
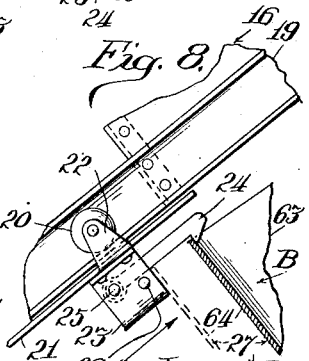
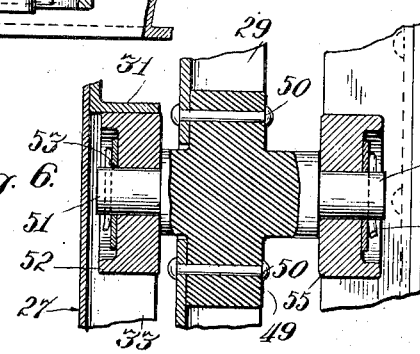
Inventor
Henry W. Nagel
By J. H. Ferguson
Attorney Patented Nov. 24, 1925.

1,562,987

UNITED STATES PATENT OFFICE.

HENRY W. NAGEL, OF CHICAGO, ILLINOIS, ASSIGNOR TO THOMAS H. FERGUSON, OF OAK PARK, ILLINOIS.

CONVEYING SYSTEM.

Application filed July 8, 1921. Serial No. 483,201.

*To all whom it may concern:*

Be it known that I, HENRY W. NAGEL, a citizen of the United States, residing at Chicago, in the county of Cook and State of Illinois, have invented certain new and useful Improvements in Conveying Systems, of which the following is a specification.

The present invention relates to conveying systems of the type in which a bucket or like receptacle is automatically carried back and forth between loading and discharging points and on each trip receives and discharges a load. Such systems are commonly employed in handling coal, grain, sand, and other materials and commodities.

One feature of my invention resides in novel means for automatically opening and closing the supply passage at the loading point. In order to fill the bucket the passage through which the material is supplied to the bucket must be opened when the bucket is in position to receive its load and must be closed when the proper amount of material has been received into the bucket. According to my invention the bucket passes close to the opening and as it does so operates a sliding door which travels in a path which is slightly inclined to the path of travel of the bucket. I make use of this difference in the paths of travel of the door and bucket to cause the bucket in its movement to its loading position to open the door, and in its movement from that position to close the door.

Another feature of my invention resides in the use of continuous guides for directing the course of the bucket throughout its to and fro travel. These guides are in constant engagement with rollers upon the bucket and are positioned so as to lie close to each other throughout one portion of the travel of the bucket and are spaced farther apart during another portion of the travel of the bucket. Specifically, they are close where the travel is vertical and farther apart where the travel is inclined, the inclined travel being used to get the bucket in loading position beneath the supply pocket.

Another feature resides in so arranging the parts that the center of gravity of the bucket is above and to one side of the point of attachment of the bail and in providing means for restraining the resulting tendency of the bucket to overturn. This arrangement contributes readily to the production of a simple structure.

Other features reside in the manner of dumping the bucket rotating it with reference to its bail, the employment of an extra rail for the bucket to travel on during a portion of its travel, the maintaining of the bail of the bucket always in a vertical position, and other details and arrangements of parts which will be apparent upon a consideration of the following detailed description taken in connection with the accompanying drawings, while the scope of the invention will be particularly pointed out in the appended claims.

It will be understood that my invention is capable of use in a variety of structures and for the handling of a variety of materials. However, the invention is particularly applicable to the handling of coal at coaling stations of railroads and other coal users. I have, therefore, chosen to illustrate my invention as applied to a coaling station.

In said drawings, Fig. 1 is a sectional elevation of a coaling station employing a conveying system constructed and arranged in accordance with the present invention; Fig. 2 is a vertical section of the bucket and associated parts the plane of section being indicated by the line 2—2 of Fig. 1; Fig. 3 is a horizontal section through the structure showing the bucket as it approaches the discharge point the plane of section being indicated by the line 3—3 of Fig. 1; Fig. 4 is a transverse section of the opening and gate at the lower end of the loading hopper the plane of section being indicated by the line 4—4 of Fig. 1; Fig. 5 is a detail view, partly in section, of the rollers and associated parts located at the pivotal point of the bucket the plane of section being indicated by the line 5—5 of Fig. 2; Fig. 6 is a similar view of the rollers and associated parts located near the top of the bucket the plane of section being indicated by the line 6—6 of Fig. 3; Fig. 7 is a detail view illustrating the bucket at the point of starting to open the sliding door which controls the discharge opening of the supply hopper; and Fig. 8 is a similar view of the bucket and door at the point where the bucket begins to close the door. Throughout these views like characters refer to like parts.

Referring to the drawings in detail, A designates the hopper or pocket for containing the material to be conveyed, B the bucket which receives the material from the hopper and conveys it to the discharge point, C the pit into which the bucket passes in order to get into loading position beneath the pocket A, D the tower in which the bucket is elevated, and E the chute into which the bucket unloads its contents.

The pocket A and the pit C are preferably located below the ground line 10 while the tower D extends upwardly from the same, as clearly illustrated. Obviously, these elements of the system may be variously constructed according to the principles of building construction. Ordinarily, however, the pocket and pit would have their walls and floor composed of concrete and the tower might be constructed of like material. These are matters which should be left to the judgment of engineers and others working in this field. The pocket walls, designated 11, converge downwardly so as to carry the material to the discharge opening 12, located at the bottom of the pocket. The pocket is preferably supplied with material from cars, such as the car 13, which travel on rails 14 mounted on girders 15 which span the pocket. Obviously, of course, the pocket might be supplied with material by other means. The opening 12 at the bottom of the pocket is provided with a spout 16 which is constructed with sheet metal walls 17 which are secured to the concrete structure of the pocket walls 11 by angle irons 18 or other suitable means. Two outer walls 17 of the spout 16 are provided with channels 19 which have their flanges extending outwardly. These channels serve as tracks upon which the roller 20 of the gate 21 are adapted to travel. It will be noted that the rollers 20 almost fill the space between the flanges of the channels 19. The door 21 fits loosely upon the end of the spout, and the rollers 20 may sometimes bear upon the lower flange and sometimes upon the upper flange, as it is shoved back and forth. In either case, there is no objectionable engagement between the door 21 and the ends of the walls 17 of the spout 16. At all times there is rolling frictional engagement and, consequently, the door 21 is moved freely to and fro. As will be seen, the opposite sides of the door 21 are provided with lugs 22 which are turned up to form bearings for the rollers 20. By this construction the interior of the spout 16 is clear of obstructions and a satisfactory action is obtained as the door is reciprocated. At this point it may also be noted that the under side of the door is provided with a U-shaped strip 23 which forms an abutment against which the end of the bucket B is adapted to strike as the bucket forces the door open. A hook 24 is mounted upon a pivot 25 which extends between the legs of the U-shaped member 23. The downward movement of this hook is limited by a stop pin 26 which extends between the same legs. The point of the hook is adapted to be engaged by the lower wall of the bucket B as the latter moves upwardly. The continued movement of the bucket by drawing upon the hook 24 closes the door 21. It may also be mentioned at this point that due to the downward convergence of the paths of travel of the door 21 and the bucket B the latter will just escape from the point of the hook 24 at the time the door 21 reaches its closed position.

The bucket B consists of a container or receptacle 27 and a bail 28. The latter consists of two upright channels 29 and a transverse channel 30, which are secured together in any approved manner. Each side of the container 27 is provided with a frame, preferably composed of angle irons, consisting of the arcuate member 31 and the radial members 32 and 33. The latter, in each instance, radiate from the center of the pivots 34 which lie in the pivotal axis of the bucket. As shown more particularly in Fig. 5, pivot 34 is rigidly secured to the container 27 so as to rotate with it. This construction may be brought about in any desired way. In the instance illustrated, the pivot 34 is squared and passes through a squared opening in a casting 35 which is suitably secured, as by rivets 36, to the wall of the container 27. The inner end of the pivot 34 is threaded and receives a nut 37. When the nut is screwed down tight against the shoulder of the pivot the parts are firmly held in place. If desired to still further secure the pivot 34 against longitudinal movement, a pin 38 may be driven through an opening in the boss of the casting 35 and into a similar opening in the pivot 34. The opposite end of the pivot 34 is reduced in diameter to form a journal for a friction roll 39 which is held in place by any suitable means such as the cotter pin 40. At an intermediate point in its length the pivot 34 passes through a sleeve 41 which carries an arm 42. Since the pivot 34 is squared and the opening through the sleeve 41 is similarly squared, it will be seen that the arm 42 will rotate with the pivot 34. At the outer end of the arm 42 I provide a friction roller 43 which is mounted upon a journal pin 44 which passes through a boss 45 at the outer end of the arm 42 and is held in position by a nut 46 screwed on to its threaded end. The sleeve 41 passes freely through an opening in the channel 29 and the latter is provided with a bearing block 47 which is secured to the channel by any suitable means as, for example, the rivets 48. The block 47 serves as a bearing for the boss 41, that is to say, as a bearing for the pivot 34 and the parts which move with it. In this way a substantial pivotal connection is made between the container 27 and the bail 28.

Passing now to a consideration of the rollers mounted near the top of the container 27, as viewed in Fig. 1, we have the structure illustrated in Fig. 6. As there shown, the channel 29 is provided with a metal block 49 which is secured to the channel by any suitable means, as rivets 50. This block is turned down at one end to form a journal 51 for a friction roller 52 which is held in place by some such means as the cotter pin 53. The opposite end of the block is similarly turned down to form a journal 54 for a friction roller 55 which is likewise held in place by a cotter pin 56. The under side of the container 27 is also provided with a double flanged wheel or roller 57. This roller may have any suitable mounting and need not be particularly illustrated or described. It will be seen that the friction roller 52 lies close to the container 27 and in position to engage the member 31 of the frame on the outside of the container. This same wheel will engage the members 32 and 33 at the ends of the rotation of the container about its pivot 34. These members 32 and 33 by thus engaging the wheel 52 serve as stops to limit the rotation of the container in either direction about its pivot. When the bucket is in loading position the wheel 52 will engage member 33. When the bucket is in discharging position the wheel 52 will engage member 32. The channel 30, which forms the upper member of the bail 28, is provided with means for the attachment of the hoisting cable 58. In the present instance, the cable is shown as passing through a U-bolt secured to the channel 30.

Passing now to a consideration of the guides and track for controlling the movement of the bucket B, we find that the same include a central, inclined rail 59 and upper and lower guides 60 and 61. There is a pair of guides 60 and 61 at each side of the bucket and these guides extend throughout the entire length of travel of the bucket. As clearly shown in Fig. 1, these guides are close together, and vertically disposed in that portion of the path of travel which lies in the tower D, but they are spaced apart and inclined in that portion of the travel which is in the pit C. It will be seen that each upper friction roller 55 engages the under side of a guide 60, whereas each lower friction roller 39 engages the upper side of a guide 61. At this point it may be mentioned that these guides may be of any preferred construction, although shown in the present instance as angle irons, and they may be secured to the building structure in which they are located in any suitable way. The same is true of the inclined track 59. The latter is parallel to the guides 60 and 61 at the point where they are inclined and does not extend out of the pit C. It is upon this track that the roller 57 travels as the bucket is being conveyed through the inclined portion of its travel.

It will be seen that by spacing the guides 60 and 61 in the way illustrated, that is to say, at a vertical distance slightly greater than the vertical distance between the centers of the rollers 39 and 55, the bail 28 may be kept in a vertical position while traveling through the inclined portion of the travel. With the construction shown the center of gravity of the container, both when loaded and unloaded, is to the left of the vertical plane passing through the bale 28 as the parts are viewed in Fig. 1. Because of this position of the center of gravity the tendency of the bucket is to rotate to the left about the pivot point 34. This, of course is resisted by the rollers 55 engaging the under sides of the guides 60. Any tendency of the bail 28 to depart from its vertical position, due to the application of force to the cable 58, is prevented by the engagement of the roller 57 with the track 59. A continued pull on the cable 58, when the bucket is in loading position, will therefore result in moving the bucket along the guides 60, 61 and the track 59 until the parts reach the dotted line position indicated at 62. When this position is reached the rollers 55 and 39, still in vertical alignment, pass upwardly between the vertically arranged portions of the guides 60 and 61.

As the bucket passes upwardly to the discharge point, it is necessary to rotate the container 27 about its pivotal axis in order to discharge the material contained in it from its open end. At this point it may be noted that the container 27 comprises two side walls 63, an end wall 64 and a bottom 65. This leaves the container free to discharge its contents into the chute E when it has been rotated about its pivotal point. The latter action is brought about by providing inclined cams 66 in the path of travel on each side of the bucket. These cams are located just below the discharge point and each engages the associated roller 43 on the arm 42 which, it will be remembered, moves with the container 27. As the bucket moves upwardly, the cams 66, which are inclined upwardly toward the guides 61, force the wheels 43 downward towards the guide 61, and in this way the cams rotate the arms 42 and cause the container 27 to move far enough to carry its center of gravity beyond the vertical plane through its pivotal point and thus cause it to dump. By reason of the location of the cams this does not occur until the container is moved far enough to discharge its contents into the chute E. It will be noted that in this position, as in previous positions, the bail remains upright. The position of the bucket, a little before the cams 66 first come into play, is shown in dotted lines in Fig. 1 as indicated at 67. The position of the bucket when dumped is similarly shown in dotted lines as indicated at 68. When in this position it will be seen that the container strikes against a roller 69 located at the entrance to the chute E. As soon as the bail begins to move downwardly, and this is arranged to occur as soon as the bucket has been dumped, the container 27 will ride on the roller 69 until it has rotated about its pivot far enough to bring its center of gravity beyond the plane of the bail and then the container will return by gravity to its normal position.

The cable 58 passes over a sheave 70 which is suitably journaled upon supporting I beams 71 near the top of the tower D. After passing over the sheave 70, the cable will extend to the drum of a suitable hoisting mechanism, as is commonly employed in systems of this kind. The latter may be of any well-known construction, and as the same forms no part of the present invention need not be shown or described.

As the bucket is lowered to its lowering position it will travel along the inclined path established by the rail 59 and the guides 60 and 61. As previously noted, this path of travel and the path of travel of the gate 21 are, with reference to each other, downwardly convergent. The parts are also so located that the upper edge of the container passes very close to the gate 21. As indicated more particularly in Figs. 7 and 8, the rear wall 64 of the container 27, as the bucket passes downwardly, engages the abutment 23 on the gate 21 and, by reason of the weight of the bucket, the gate 21 is forced open notwithstanding the pressure exerted against it by the materials in the pocket A. The bucket is brought to a stop when reaching the position indicated by the dotted lines in Fig. 8, and is then in position to be loaded. Indeed, as the gate opens the material flows through the spout 16 into the container 27. As soon as the bucket starts on its return, the rear edge 64 of the container 27 will engage the hook 24, as indicated in Fig. 8, and the continued advance of the bucket in an upward direction will carry the gate 21 along with it cutting through the material and finally closing the opening of the spout 16. As soon as the gate is moved to its fully closed position, the rear edge 64 of the container will have reached the dotted line position of Fig. 7 and, as there shown, the hook will just clear the end of the bucket at this point and the bucket will continue on its course without further action upon the gate.

Obviously, the parts heretofore described may be variously arranged and supported. These details of the building structure by which the various parts would be supported are not shown in detail, as it is believed the same are wholly unnecessary to a disclosure of the present invention. At this point attention may be called to the fact that the cable 58 in its passage from the pit C to the tower D, passes over a pulley 73 located upon a transverse member 74 of the frame of the building. In other arrangements of the parts, other guiding means might be similarly employed.

In carrying out my invention, it will be apparent that many alterations and modifications may be made in the specific structure disclosed without departing from the spirit and scope of my invention. I, therefore, do not wish to be limited to the details of construction and the specific arrangements herein disclosed but aim to cover, by the terms of the claims, all such alterations and modifications as rightly come within the scope of my invention.

What I claim as new and desire to secure by Letters Patent of the United States, is:

1. A conveying system including a pocket having a discharge opening at a low point through which material may pass from the pocket by gravity, a flat reciprocating door movable in its own plane in a direction inclined to the vertical, guides extending from a receiving position below said opening in a like inclined direction beyond the limits of said pocket and then vertically to a dumping position, a bucket container, a bucket bail connected to said container below and to one side of the center of gravity of said container so as to give it a tendency to overturn toward said pocket, stop means for limiting the movement of the container relative to the bail in that direction, means cooperating with said guides to maintain said bail upright in its travels with the bucket container to and fro between said receiving and dumping positions, the paths of travel of said door and container being slightly convergent downward at said receiving position, means dependent upon said convergence acting between said door and a near portion of said container to open said door as said container moves downward and to close said door as said container moves upward, and means for preventing said container from being moved about its connection to said bail in a direction away from said pocket as a result of the engagement of said door with said container during the latter's downward movement.

2. A conveying system including a pocket having a discharge opening at a low point through which material may pass from the pocket by gravity, a flat reciprocating door movable in its own plane in a direction inclined to the vertical, guides extending from a receiving position below said opening in a like inclined direction beyond the limits of said pocket and then vertically to a dumping position, a bucket container, a bucket bail connected to said container below and to one side of the center of gravity of said container so as to give it a tendency to overturn toward said pocket, stop means for limiting the movement of the container relative to the bail in that direction, means cooperating with said guides to maintain said bail upright in its travels with the bucket container to and fro between said receiving and dumping positions, the paths of travel of said door and container being slightly convergent downward at said receiving position, an abutment on said door engaged by the end wall of said container as it moves to said receiving position to force said door open, a pivoted hook on said door engaged by the end wall of said container as it moves away from said receiving position to draw said door shut, a stop for limiting the downward movement of said hook whereby said container is freed from said door after the latter has been fully shut, due to the divergence upward of the paths of travel of said container and door, an inclined rail extending in a direction parallel to that of the inclined portion of said guides, and a roller on said container for traveling on said rail as the container moves through the inclined portion of its path of travel, said roller and rail thereby preventing said container from being moved about its connection to said bail in a direction away from said pocket as a result of the engagement of said door with said container during the latter's downward movement.

3. In a conveying system, a pocket having an inclined lower wall provided with an opening through which material may pass from the pocket by gravity, a rectangular spout at said opening having its axis perpendicular to the plane of said wall, channels extending substantially parallel to said wall and secured to the outside of parallel walls of said spout with the flanges extending outward, a flat door having upturned lugs adjacent to and outward of said channels, rollers journaled in said lugs and riding between and upon said flanges, an abutment on the under side of said door approximately midway between the planes of said channels, a pivoted hook on said abutment extending in a plane parallel to the planes of said channels, a stop on said abutment for limiting the downward movement of said hook, and a bucket container movable along a path converging downward slightly relative to the path of travel of said door and consequently relative to the channel flanges, said door having an end adapted to engage said abutment to force said door open and to be engaged by said hook to draw said door shut, the hook and end being drawn apart, because of the divergent paths of the door and bucket, as soon as said door reaches its fully closed position.

4. In a conveying system, a bail and container, two vertically aligned rollers on each side of said bail, two guides on each side of the path of travel of said bail in position to continuously engage with said rollers, said guides being vertical, parallel and close together at their upper ends and inclined, parallel and spaced apart at their lower ends a distance somewhat less than the distance between said upper and lower rollers, said rollers being vertically aligned in all positions of said bail and engaging said guides indifferently as they travel along them where vertical and the upper rollers engaging only the under side of the upper guides where inclined and the lower rollers engaging only the upper side of the lower guides where inclined, and means for tilting said container relative to said bail without disturbing the vertical alignment of the rollers thereon.

5. In a conveying system, a bucket container, a bucket bail connected to the container below and to one side of the center of gravity of the container so as to give a tendency to overturn in one direction, stop means for limiting the movement of the container relative to the bail in that direction, upper and lower rollers on each side of the bail, a pair of guides cooperating with the rollers on each side of the bail, which guides are inclined upwardly and oppositely to said first mentioned direction, and spaced apart so that the upper rollers engage only the under sides of the upper guides and the lower rollers ride only upon the upper sides of the lower guides and the bail is maintained vertical thereby, means for rocking the container relative to the bail in a direction opposite to said first mentioned direction to dump the same, and stop means on the bail and container for limiting the movement of the latter relative to the former as the container is moved to dumping position.

6. In a conveying system, a bucket container, a bucket bail connected to the container below and to one side of the center of gravity of the container so as to give a tendency to overturn in one direction, stop means for limiting the movement of the container relative to the bail in that direction, an inclined rail extending upwardly in the opposite direction, a roller on said container for traveling on said rail as the container and bail are drawn upward along said rail, a pair of inclined guides parallel to and above said inclined rail and positioned on opposite sides of said container and bail, and means on said bail for engaging said guides on the under side thereof to prevent the container from rising from said rail by reason of its tendency to overturn.

7. In a conveying system, a bucket container, a bucket bail connected to the container below and to one side of the center of gravity of the container so as to give a tendency to overturn in one direction, stop means for limiting the movement of the container relative to the bail in that direction, an inclined rail extending upwardly in the opposite direction, a roller on said container for traveling on said rail as the container is drawn upward along said rail, upper and lower rollers on each side of the bail, a pair of guides cooperating with the rollers on each side of the bail, which guides extend parallel to said rail and are spaced apart so that the upper rollers engage only the under sides of the upper guides and the lower rollers engage only the upper sides of the lower guides and the bail is maintained vertical thereby and the container is kept from rising out of engagement with said rail by reason of its said tendency to overturn, means for rocking the container relative to the bail to dump the same in a direction opposite to said first mentioned direction, and stop means on the bail and container for limiting the dumping movement of the latter relative to the former.

In testimony whereof, I hereunto subscribe my name this 28th day of June, A. D. 1921.

HENRY W. NAGEL.